United States Patent
Montag et al.

(10) Patent No.: US 8,320,895 B2
(45) Date of Patent: Nov. 27, 2012

(54) METHOD FOR HANDLING CALLS SWITCHED BY PRIVATE BRANCH EXCHANGES TO A MOBILE COMMUNICATIONS NETWORK

(75) Inventors: Uwe Montag, München (DE); Stephan Schaade, Buchloe (DE)

(73) Assignee: Siemens Enterprise Communications GmbH & Co. KG, Munich (DE)

( * ) Notice: Subject to any disclaimer, the term of this patent is extended or adjusted under 35 U.S.C. 154(b) by 969 days.

(21) Appl. No.: 11/903,149

(22) Filed: Sep. 20, 2007

(65) Prior Publication Data

US 2008/0070552 A1   Mar. 20, 2008

(30) Foreign Application Priority Data

Sep. 20, 2006 (EP) .................................. 06019702

(51) Int. Cl.
*H04M 3/42* (2006.01)
*H04W 40/00* (2009.01)
(52) U.S. Cl. .......................... 455/417; 455/445
(58) Field of Classification Search .................. 455/417, 455/555, 412.1–412.2
See application file for complete search history.

(56) References Cited

U.S. PATENT DOCUMENTS

| 4,969,182 | A | * | 11/1990 | Ohtsubo et al. | 379/67.1 |
| 5,144,653 | A | * | 9/1992 | Masuoka | 379/111 |
| 5,329,578 | A | * | 7/1994 | Brennan et al. | 379/211.03 |
| 6,876,728 | B2 | * | 4/2005 | Kredo et al. | 379/88.17 |
| 6,956,832 | B1 | * | 10/2005 | Muhonen et al. | 370/310 |
| 2002/0114329 | A1 | * | 8/2002 | Galvin et al. | 370/389 |
| 2005/0164686 | A1 | * | 7/2005 | Bushnell et al. | 455/417 |

FOREIGN PATENT DOCUMENTS

WO   WO 2005/013624 A2   2/2005

* cited by examiner

*Primary Examiner* — Dwayne Bost
*Assistant Examiner* — Christopher Kohlman

(57) ABSTRACT

A method and to an arrangement for handling calls switched by private branch exchanges to a mobile communications network are provided. The mobile communications network and a branch exchange communicate with a control device in such a way that in switching of a call request originating from a communication device connected to the private branch exchange to a mobile communication terminal of the mobile communications network there is no call setup on the part of the private branch exchange when the mobile communication device has logged out.

18 Claims, 1 Drawing Sheet

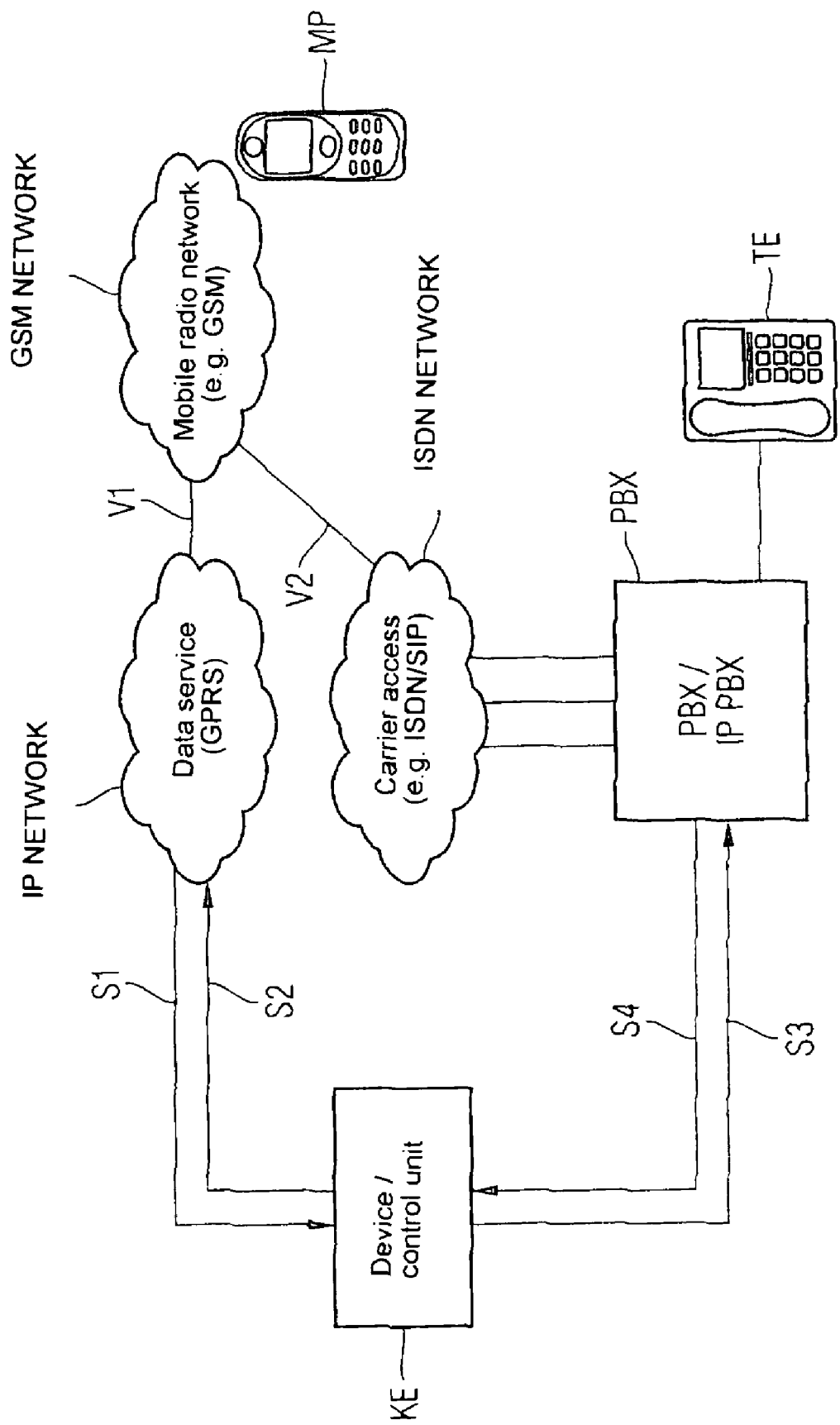

METHOD FOR HANDLING CALLS SWITCHED BY PRIVATE BRANCH EXCHANGES TO A MOBILE COMMUNICATIONS NETWORK

CROSS REFERENCE TO RELATED APPLICATIONS

This application claims priority of European application No. 06019702.7 EP filed Sep. 20, 2006, which is incorporated by reference herein in its entirety.

FIELD OF INVENTION

The present invention relates to a method for handling calls switched by private branch exchanges to a mobile communications network.

SUMMARY OF INVENTION

It is known that communication links, in particular telephone calls, are made from a landline to communication devices of mobile communications networks and vice versa. In both networks it is conventional to give the user of the terminal the opportunity not to miss incoming calls in his absence by providing local call answering functions or central mailbox functions. For a caller this means that in the event of absence of the user he is trying to contact a message can be left but interaction with the desired user is not possible. Costs also occur, so apart from basically, at the very least, not being completely satisfactory, leaving messages also incurs additional costs. The only possibility that remains to the caller of avoiding these costs is to interrupt the communication link in good time.

The object underlying the invention lies in disclosing a method and an arrangement which ensures greater user acceptance.

This object is achieved by the method and arrangement as claimed in the independent claims.

In the method according to the invention for handling calls switched by private branch exchanges to a mobile communications network the mobile communications network and a branch exchange communicate in such a way with a control device that in switching of a call request originating from a communication device connected to the private branch exchange to a mobile communication terminal of the mobile communications network there is no call setup on the part of the private branch exchange when the mobile communication device has logged out.

This ensures that no unnecessary costs result from the fact that the relevant user is forwarded to a mobile mailbox by a call request transmitted on a private network. External network resources are also spared unnecessary occupation by communication channels.

This may advantageously be developed in that recording of a voice message is offered by the private branch exchange when there is no call setup, a recorded voice message being stored for the mobile communication device, so as to be retrievable, in a storage device associated with the private branch exchange. This means that, as before, it is possible for the mobile communication terminal or the user of this device to receive a communication or message, while retaining said tariff rate advantage to the user of the private network.

Alternatively or additionally an advantageous development lies in the fact that the absence of a call setup is achieved by the private branch exchange blocking a number associated with the mobile communication device. What is involved in this connection is a simple embodiment of absence of a call setup based on the functionality of known private branch exchanges.

The absence of a call setup preferably takes place on the basis of a first message sent by the control device to the private branch exchange. This ensures that the control device controls the private branch exchange, and, ideally, known private branch exchanges do not have to undergo a modification, or only have to undergo a minor one, in order to be able to advantageously carry out the method according to the invention.

Moreover, when the mobile communication device has logged in a call is preferably made to the mobile communication device by way of a connection with the mobile communication device executed on the part of the private branch exchange.

The call is executed on the basis of a second message sent by the control device to the private branch exchange, so control on the part of the control device is also ensured for this case, and the private branch exchange and the mobile communication device are largely spared changes to the execution of the method.

Provision of the first and/or second message(s) takes place on the basis of information transmitted to the control device about a change in the status of the mobile communication device.

A further advantageous embodiment of the method according to the invention lies in the fact that the change in status is detected in such a way that the mobile communication device establishes a call to a first port of the private branch exchange, the call is abandoned again immediately after it has been established, the private branch exchange detects the call that has been made and detects the information associated with the mobile communications terminal. The advantage of this approach lies in the fact that by identifying a specific port of the private branch exchange it is clear from selection of precisely this port that the calling mobile communication device is signaling a change in status, so very straightforward implementation of the method is thus assisted.

As an alternative to this the change in status can be detected in that the mobile communication device establishes a call to a first extension of the private branch exchange, the call is abandoned again immediately after it has been established, so the private branch exchange detects the call that has been made and information associated with the mobile communication terminal can be transmitted to the control device.

The control device preferably detects this associated information in the process, this detection preferably taking place on the basis of the D-channel monitoring function of the private branch exchange. This, to a certain extent, automatic, detection on the part of the control device means that it is capable of reacting immediately to the change in status.

An advantageous development presents itself in such a way that the call number of the mobile communication terminal is detected as information. This information alone is usually sufficient for detection or capturing thereof to be achieved simply and in a manner that conserves resources.

In a further advantageous embodiment of the method the status of the mobile communication device is reversed in each case by the establishment of the call, i.e. it is detected for example whether a state for the associated information, in particular the call number, exists and if so, this status is reversed. Otherwise a default state is set.

Alternatively or additionally it is advantageous for the change in status to be detected in such a way that the mobile communication device transmits information associated with it via a data service that uses the "Internet Protocol" IP in particular and functions according to the "General Packet Switched Radio" GPRS, "Wireless Application Protocol", WAP in particular. This development makes it possible in particular to communicate directly with the control device or to also transmit more extensive data merely via the call number, for example plain text, such as available or unavailable. This development also constitutes an alternative to the approach of calling the private branch exchange directly, which can be important for example if this method should be blocked.

However, the information preferably includes the call number of the mobile terminal and at least the status, in particular whether this denotes available or unavailable.

A further advantageous embodiment consists in the control unit being able to read out information of the private branch exchange for further processing via a data service that uses the "Internet Protocol" IP in particular and functions according to the "General Packet Switched Radio" GPRS, "Wireless Application Protocol", WAP in particular. The control device is thus rendered capable of being able to read out all available private branch exchange information.

BRIEF DESCRIPTION OF THE DRAWINGS

Further details and advantages of the invention shall be described in more detail starting from the exemplary embodiments shown in the single figure, in which:

The figure schematically shows an example of an arrangement according to the invention with two of the possible variants of the inventive method.

DETAILED DESCRIPTION OF INVENTION

The figure shows a schematic diagram of elements that carry out or implement the inventive method.

Firstly a private branch exchange PBX can be seen to which, for simplification, only one user terminal TE, which can be constructed as a telephone, is connected. A mobile phone MP is also shown which comprises a connection to a mobile communications network GSM network. In simplistic terms it is a GSM network. However, the invention also comprises mobile communications networks and standards, such as UMTS.

If a communication link is now to be established to this mobile part MP by a user who is using the user terminal TE, according to the inventive method of a first exemplary embodiment the user can avoid a futile call request, leading to actions that result in costs, such as recording a mailbox message in the mobile communications network, in that, according to a first variant V1, a control unit KE operated between the mobile communications network GSM-NETWORK and the private branch exchange PBX [receives] recorded information about the login or logout status of the mobile communications terminal MP, which the mobile part MP by using IP-based data services, such as GPRS, which are transmitted to the control device KE via an IP network IP NETWORK, and in the event that the mobile part MP has informed the control device KE that it has logged out does not allow the request for a connection, incoming via the branch exchange PBX, to end in a call to the mobile device MP but instead blocks the dialed mobile communications number for the call or according to an alternative of the invention automatically routes it to an internal voice mailbox which can be called by the mobile part MP, so no costs result for the user TE supplied by the private branch exchange PBX, and in the event that the communication device KE has information that the mobile part MP has logged in, allows the call request to end in a connection to the mobile communications network GSM in such a way that the control device KE gives the branch exchange PBX a corresponding instruction which causes the branch exchange PBX to allow this call request to become a connection to the mobile communications network GSM or ultimately to the mobile device MP.

In a further alternative V2 according to the invention, and therefore a further exemplary embodiment, which is also included in the schematic diagram, the control device KE receives information about a mobile communications user who is logging in or out via the branch exchange PBX, which, in turn, receives this information about the carrier access ISDN NETWORK and the mobile communications network GSM NETWORK triggered by the mobile part MP.

In the illustrated example the control unit KE therefore has at least five functions.

A first function which becomes important if the mobile phone MP registers with the control unit KE and the state achievable is communicated and is characterized in that, following such logging-in, the control unit KE issues the branch exchange PBX with the task of clearing the call number of the mobile phone MP, so any user of the branch exchange PBX who wishes to call this cleared mobile number is also connected by the branch exchange PBX as usual.

A second function which becomes important if the control unit KE issues the branch exchange PBX with the task of clearing the mobile number in the branch exchange, which is configured in such a way that the mobile phone MP is given the opportunity to also log out of the control unit KE if it is no longer available to accept calls, wherein, as described above, this can be achieved via at least two methods, V1, V2, which may optionally also be combined.

In the case of the second variant V2 the branch exchange PBX receives the logout status on the part of the mobile phone MP in that the mobile phone MP calls a defined port or alternatively a defined extension of the branch exchange PBX and immediately hangs up again, so the branch exchange PBX can detect the call number of the absent mobile phone MP hereby and can forward it to the control unit KE. This detection or forwarding can take place via the D-channel monitoring functions of a branch exchange PBX.

In the first variant V1 a message is transmitted via the IP data services, from which message the control device KE can infer that the mobile phone MP is no longer available for incoming calls. The mobile number is therefore transmitted via a data service that is supported on the mobile communications-side, such as GPRS or the like.

A third function becomes important if, according to the first variant, the mobile phone logs out of the control unit in that it communicates that it has not attained the state, and then issues the control unit KE of the branch exchange PBX with the task of blocking this call number of the mobile phone MP, so any user of the branch exchange PBX who wishes to call this blocked mobile number is not routed by the branch exchange PBX into the mobile network or connected thereto but by way of a fourth function of the control device KE, which becomes important if the task of blocking a mobile number has just occurred, the user of the branch exchange PBX, from which this wish emanated, is forwarded to an internal voice mailbox in the case of call requests to this number.

The control unit KE is configured in such a way that it can accept, recognize and process information of any kind from the branch exchange PBX and, for example, processed via a data service, such as GPS, transmits it to a specific mobile phone MP.

By way of example it would also be conceivable for the branch exchange PBX to communicate to the control unit KE which caller has tried to reach the mobile number while this number was blocked in the branch exchange owing to the absence of the mobile part MP. A fifth function of the control unit is therefore provided hereby.

Logging in or out of a mobile phone MP by way of a data service can, for example, be achieved very simply in that the mobile phone MP is provided with a Java-based program, i.e. a platform-dependent program, which executes control for handling communication with the control unit KE. It would also be conceivable in this connection for calls to the control unit KE or reception and processing of the information from the control unit, for example the caller list, to also access Java-based programs of this kind hereby.

The invention is not restricted to the illustrated exemplary embodiments thereby, instead all variations that lie within the scope of expert competence and which reproduce the core ideas of the invention are incorporated:

- a first step S1: the control unit KE receives login or logout information of the mobile communications terminal MP; for example via GPRS,
- a second step S2: the control unit KE controls the mobile device MP, for example via GPRS,
- a third step S3: the control unit KE controls the private branch exchange PBX (instruction: clear or block call number of specific mobile communications user, optionally forward call to internal mailbox),
- alternatively or additionally a fourth step S4: the control unit KE receives information from the private branch exchange PBX (for example the login or logout information of the mobile communication user or device MP).

The invention claimed is:

1. A method for handling calls switched by a private branch exchange to a mobile communications network, comprising:
   communicating a log out of a mobile communication terminal of the mobile communication network, the communicating of the log out comprising:
      the mobile communication terminal establishing a call to one of a first port of the private branch exchange and a first extension of the private branch exchange and subsequently abandoning that call after the call is established such that the private branch exchange detects the call that was established and information associated with the mobile communication terminal, and
      the private branch exchange sending the information associated with the mobile communication terminal that the private branch exchange obtained from the abandoned call to a control device to inform the control device of the log out by the mobile communication terminal; and
   wherein when the mobile communication terminal is logged out, switching of a call request from a communication device to the mobile communication terminal is blocked by the private branch exchange.

2. The method as claimed in claim 1, the method further comprising:
   recording of a voice message being offered by the private branch exchange; and
   storing the recorded voice message in a storage device associated with the private branch exchange such that the message is obtainable via the mobile communication terminal.

3. The method as claimed in claim 1, wherein the mobile communication terminal is a mobile communication device and wherein when the mobile communication device has logged in, a call is made to the mobile communication device via a connection to the mobile communication device executed via the private branch exchange.

4. The method as claimed in claim 1, wherein switching of a call request from the communication device to the mobile communication device is such that the call request is blocked by the private branch exchange based on a first message sent by the control device to the private branch exchange.

5. The method as claimed in claim 4, wherein when the mobile communication terminal has logged in, a call is made to the mobile communication terminal via a connection to the mobile communication terminal executed via the private branch exchange.

6. The method as claimed in claim 5, wherein the call made to the mobile communication terminal is executed based on a second message sent by the control device to the private branch exchange.

7. The method as claimed in claim 6, wherein at least the first or second message is sent based on information transmitted to the control device about a change in status of the mobile communication terminal.

8. The method as claimed in claim 1, wherein when the mobile communication terminal has logged in, a call is made to the mobile communication terminal via a connection to the mobile communication terminal executed via the private branch exchange.

9. The method as claimed in claim 1, wherein the information associated with the mobile communication terminal is comprised of a call number of the mobile communication terminal.

10. The method as claimed in claim 1, wherein the mobile communication terminal communicates a log in after communicating the log out, the communication of the log in comprising:
    the mobile communication terminal establishing a call to one of the first port of the private branch exchange and the first extension of the private branch exchange and subsequently abandoning that call after that call is established such that the private branch exchange detects the call that was established for communicating the log in and information associated with the mobile communication terminal; and
    the private branch exchange subsequently sends the information associated with the mobile communication terminal that the private branch exchange obtained from that abandoned call made for communicating the log in to the control device to inform the control device of the log in by the mobile communication terminal.

11. An arrangement for handling calls switched by a private branch exchange to a mobile communications network, comprising:
    a private branch exchange communicatively connected to a communication device;
    a mobile communications network communicatively connected to a mobile communication terminal; and
    a control unit device communicatively connected to the private branch exchange and the mobile communications network, the control unit device receives a log out of the mobile communication terminal from the mobile communications network, the log out being subsequently provided by the control unit device to the private branch exchange; and
    wherein a call from a communication device to the logged out mobile communication device is blocked by the private branch exchange as a result of being informed of the log out by the mobile communication terminal via the control unit device; and the mobile communication terminal communicating a log-in of the mobile communication terminal by the mobile communication terminal establishing a call to one of a first port of the private branch exchange and a first extension of the private branch exchange and subsequently abandoning that call after the call is established such that the private branch exchange detects the call that was established and information associated with the mobile communication terminal; and the private branch exchange sending the information associated with the mobile communication terminal that the private branch exchange obtained from the abandoned call to the control unit device such that a status of the mobile communication terminal is changed from being logged out to being logged in; and wherein switching of a call request from the communication device to the mobile communication terminal is not blocked when the mobile communication terminal has a logged in status.

12. The arrangement as claimed in claim 11, wherein the call from the communication device is blocked based on a directory number of the mobile communication device when the mobile communication device is logged out.

13. The arrangement as claimed in claim 11, wherein the blocked call from the communication device is forwarded to a message facility associated with the private branch exchange.

14. The arrangement as claimed in claim 13, wherein a message is stored in a storage device associated with the private branch exchange in response to the forwarding of the blocked call from the communication device to the message facility, and wherein the stored message is retrievable by the mobile communication terminal.

15. An arrangement for handling calls comprising:
a private branch exchange communicatively connected to a communication device;
a mobile communications network communicatively connected to a mobile communication terminal; and
a control unit device communicatively connected to the private branch exchange and the mobile communications network, the control unit device receiving a log out of the mobile communication terminal via the mobile communications network; and wherein a first message is sent to the control unit device in response to a call from the communication device to the logged out mobile communication device; and wherein the control unit blocks a set up of a call between the communication device and the mobile communication terminal by the private branch exchange;

wherein the mobile communication terminal communicating a log-in of the mobile communication terminal by the mobile communication terminal establishing a call to one of a first port of the private branch exchange and a first extension of the private branch exchange and subsequently abandoning that call after the call is established such that the private branch exchange detects the call that was established and information associated with the mobile communication terminal, the information associated with the mobile communication terminal comprising a call number; and the private branch exchange sending the information associated with the mobile communication terminal that the private branch exchange obtained from the abandoned call to the control unit device such that a status of the mobile communication terminal is changed to a logged in status; and wherein switching of a call request from the communication device to the mobile communication terminal is not blocked when the mobile communication terminal has a logged in status.

16. The arrangement as claimed in claim 15, wherein the blocked call between the communication device and the mobile communication terminal is forwarded to a message facility associated with the private branch exchange via the private branch exchange.

17. The arrangement as claimed in claim 16, wherein a message is stored in a storage device associated with the private branch exchange in response to forwarding the blocked call to the message facility, and wherein the stored message is retrievable by the mobile communication terminal, the mobile communication terminal being a mobile communication device.

18. The arrangement of claim 11 wherein the control unit device receives the log out of the mobile communication terminal via a directory service.

* * * * *